US 6,716,357 B1

(12) United States Patent
Maekawa et al.

(10) Patent No.: US 6,716,357 B1
(45) Date of Patent: Apr. 6, 2004

(54) METHOD OF REMOVING PHOSPHORIC ACID CONTAINTING WASTEWATER

(75) Inventors: Takaaki Maekawa, Ibaraki (JP); Kazuo Fujita, Ibaraki (JP)

(73) Assignee: Japan Science and Technology Corporation, Saitama (JP)

( * ) Notice: Subject to any disclaimer, the term of this patent is extended or adjusted under 35 U.S.C. 154(b) by 0 days.

(21) Appl. No.: 09/913,736

(22) PCT Filed: Feb. 18, 2000

(86) PCT No.: PCT/JP00/00933

§ 371 (c)(1),
(2), (4) Date: Oct. 31, 2001

(87) PCT Pub. No.: WO00/48947

PCT Pub. Date: Aug. 24, 2000

(30) Foreign Application Priority Data

Feb. 19, 1999 (JP) ............................................ 11-041970

(51) Int. Cl.$^7$ ................................................. C02F 1/58
(52) U.S. Cl. .................. 210/695; 210/714; 210/715; 210/728; 210/730; 210/731; 210/732; 210/733; 210/738; 210/748; 210/906
(58) Field of Search ............................... 210/667, 679, 210/681, 710, 714, 717, 724, 728, 738, 748, 906, 730, 731, 732, 733, 695, 715

(56) References Cited

U.S. PATENT DOCUMENTS

| 3,997,436 | A | * | 12/1976 | Stoev et al. ............... 209/426 |
| 4,122,192 | A | * | 10/1978 | Fellows ..................... 514/705 |
| 5,518,631 | A | * | 5/1996 | Maeda ........................ 210/702 |
| 5,626,764 | A | * | 5/1997 | Burns et al. ................ 210/661 |
| 5,665,241 | A | * | 9/1997 | Maeda et al. ............... 210/683 |
| 6,007,712 | A | * | 12/1999 | Tanaka et al. .............. 210/151 |

FOREIGN PATENT DOCUMENTS

| JP | 58-210893 | 12/1983 |
| JP | 6-210282 | 8/1994 |
| JP | 7-39754 | 2/1995 |
| JP | 7-108292 | 4/1995 |
| JP | 7-136664 | 5/1995 |
| JP | 9-103788 | 4/1997 |
| JP | 11-216479 | 8/1999 |

* cited by examiner

Primary Examiner—Peter A. Hruskoci
(74) Attorney, Agent, or Firm—Wenderoth, Lind & Ponack, L.L.P.

(57) ABSTRACT

A method of removing phosphoric acid contained in wastewater which comprises comprehensively immobilizing calcium or a compound thereof with a solid polymer optionally together with magnetite and contacting the calcium-containing polymer with the wastewater to react the phosphoric acid contained in the wastewater with the calcium and thereby yield calcium apatite.

15 Claims, 5 Drawing Sheets

METHOD OF REMOVING PHOSPHORIC ACID CONTAINTING WASTEWATER

This application is a 371 application of PCT/JP00/00933 filed Feb. 18, 2000.

TECHNICAL FIELD

The invention of the present application concerns a method of removing phosphoric acid from general domestic wastewater, industrial wastewater or the like. Further, more in particular, the invention of the present application concerns a method of removing phosphoric acid from domestic wastewater, as well as various kinds of wastewater discharged from food industries to and agricultural production fields.

BACKGROUND ART

The concentration of phosphoric acid in domestic wastewater is about 2 to 3 mg/L and removal of phosphoric acid in the domestic wastewater has become an important subject for the requirement of removing phosphoric acid from wastewater, for example, from food industries and agricultural production fields, as well as for preventing eutrophication rivers and lakes.

In view of the subject described above, studies have been made so far on the removal of phosphoric acid. Then, a method of removing phosphoric acid by reacting phosphoric acid in a solution containing calcium in excess has been proposed. However, since this existent method is adapted to add a calcium solution to liquid wastes containing phosphoric acid by way of a pump or the like, it has been a problem that calcium can not easily be added in domestic wastewater draining channels.

DISCLOSURE OF THE INVENTION

In view of the above, for solving the subject in the prior art as described above and facilitating addition of calcium to wastewater, the inventors of the present application have invented a method of gradually releasing calcium by supports including calcium and adding the same to wastewater in draining channels.

That is, the invention provides, at first, a method of removing phosphoric acid contained in wastewater, which comprises including and immobilizing calcium or a compound thereof in a polymeric solid, bringing the same into contact with wastewater and forming calcium apatite by the reaction between phosphoric acid in wastewater and calcium.

Further, the invention provides, secondly, a method of removing phosphoric acid contained in wastewater, which comprises including and immobilizing calcium or a compound thereof and magnetite in a polymeric solid, bringing the same into contact with wastewater and forming calcium apatite by the reaction between phosphoric acid in wastewater and calcium.

The invention provides, thirdly, the method described above in which the calcium compound is at least one member from water solubilized calcium, inorganic acid salt of calcium and organic carboxylic acid salt of calcium, fourthly, the method as described above in which the polymeric solid is at least one member from polyvinyl alcohol, partially esterified polyvinyl alcohol, polyacrylic acid, partially esterified polyacrylic acid, starch, partial acetylated starch, polysaccharides and partial esterified product of polysaccharides, fifthly, the method as described above in which the polymeric solid is a gelled polyvinyl alcohol or a partially esterified product thereof, sixthly, the method as defined above in which the polymeric solid has a multi-layered structure and, seventhly, the method described above in which the polymeric solid is formed with a coating layer of calcium alginate.

Then, the invention provides, eighthly, a method of controlling surface deposition of calcium phosphate and diffusion of calcium by mechanically vibrating a polymeric solid containing calcium or a compound thereof, ninthly, a method of controlling surface deposition of calcium phosphate and diffusion of calcium by mechanically or electromagnetically vibrating a polymeric solid containing calcium or a compound thereof and magnetite, and, tenthly, a method of recovering calcium apatite formed in running water.

Further, the invention provides, eleventhly, an inclusive immobilizing support for removing phosphoric acid in wastewater in which calcium or a compound thereof is supported on a polymeric solid, and, twelfthly, an inclusion immobilizing support in which magnetite is contained in the polymeric solid.

Figure 1:
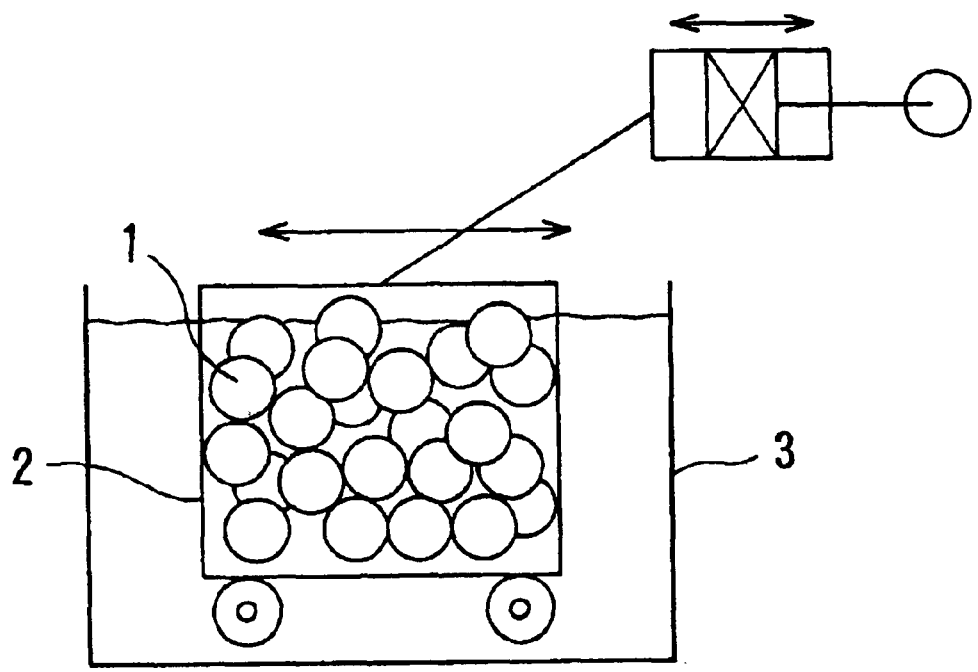
FIG. 1 shows a cross sectional view illustrating an example of a mechanical vibration system.

(1) immobilizing support
(2) net
(3) processing tank
(4) magnet
(5) drain channel
(6) settling tank
(7) calcium apatite crystal
(8) cage

BEST MODE FOR CARRYING OUT THE INVENTION

The invention has the features as described above and the mode of practicing thereof is to be explained.

In the invention, an inclusion solid support in which calcium is supported on a polymeric solid is used for removing phosphoric acid in wastewater. The polymeric solid in this case, more preferably contains magnetite, and various kinds of materials may be used so long as they have satisfactory supporting property for calcium and, for example, polymers having anionic groups such as hydroxy groups or carboxyl groups, and like other various kinds of materials may be used. For example, more preferred materials may include polyvinyl alcohol (PVA), partially esterification (such as acetylation) products thereof, polyacrylic acid, partial esterification products (methyl esters), starch powder, partial acetylation products thereof, as well as other polysaccharides.

Calcium may be supported on the polymeric solid as calcium or as a calcium compound such as calcium hydroxide, calcium carbonate, calcium chloride and calcium organic carboxylate. For the support to the polymeric solid in the invention of the present application, it may have a multi-layered structure. For example, calcium hydroxide or calcium carbonate may be kneaded into acetylated starch, which is molded into a spherical or pellet shape and then a PVA layer may be formed to the surface of the molding product by using an aqueous solution of polyvinyl alcohol (PVA). Further, it may consist only of PVA without using Starch.

Then, since water-containing PVA has a strong solid structure by repetitive refrigeration and thawing into a gel, the repetitive processing of refrigeration and thawing is effective.

The refrigeration in this case is preferably conducted as a processing within a range from −30° C. to −15° C. for 20 to 60 hours.

Further, it is preferred that the PVA concentration of the aqueous solution of PVA is from 5 to 20% by weight, the average molecular weight of PVA is from 1000 to 4000 and, more preferably, 1500 to 2500. Further, the degree of gelation is preferably 80% or more.

For the size of the polymeric solid, the maximum outer diameter, for example, is suitably from 3 to 20 mm.

In the invention of the present application, by utilizing the nature of alginic acid ions of chemically bonding with calcium ions to form a polymer, alginic acid may be coated on the surface of the polymeric solid described above, which is then treated with a solution such as of calcium chloride, to form a layer of calcium alginate.

The concentration of alginic acid in this case is suitably from 0.2 to 1.0% by weight.

It is of course possible to form a PVA coating layer further on the coating of calcium alginate as described above and gelling the same by repetitive refrigeration and thawing. Although not always necessary, magnetite is incorporated into the polymer for providing the polymer with magnetic property and make the support displaceable or movable by magnetic fields generated by magnetic field forming means (for example, electromagnet or permanent magnet disposed) to a wastewater processing tank or to the outside of a wastewater processing zone. The magnetite may be a powder of super-paramagnetic material not adhering to each other if the magnetic field is not present. For instance, it may be a powder of oxide of metals such as iron.

The method of the invention and the immobilizing support used therefor can include an embodiment that supported calcium reacts with phosphoric acid in wastewater on the surface of the immobilizing support or in a state released in the solution to form calcium phosphate, that is, calcium apatite, which may be separated as recovered as crystals.

Figure 2:
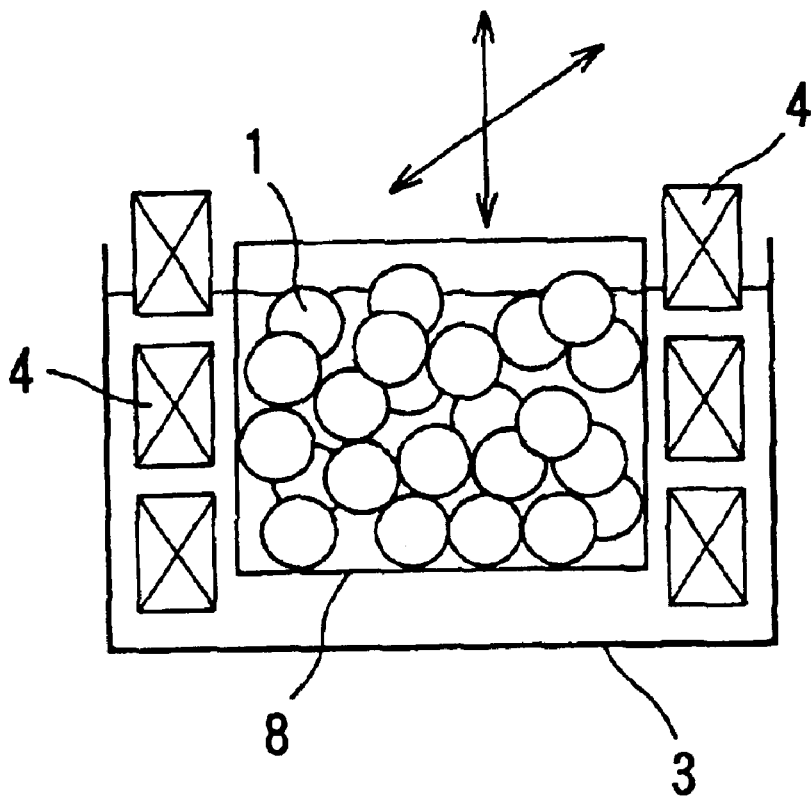
FIG. 2 shows a cross sectional view illustrating an example of a vibration system using an electromagnet.

In a state where calcium phosphate crystals are deposited as they are on the surface of the support, since diffusion of calcium may possibly be hindered, deposition of crystals on the surface of the support can be prevented, for example, as shown in FIG. 1, by enclosing an immobilizing support (1) with a net (2) of a large pore size or the like, which is placed in a processing tank (3) and vibrated mechanically. Further, deposition of crystals to the surface of the support can be prevented in the same manner also by incorporating magnetite to the support (1) of the polymeric solid and vibrating them by changing the magnetic fields by an electromagnet (4) disposed at the periphery as shown in FIG. 2.

Also with the view point of controlling the releasing density of calcium, the releasing rate can be controlled by vibrating the support by the methods described above.

Figure 3:
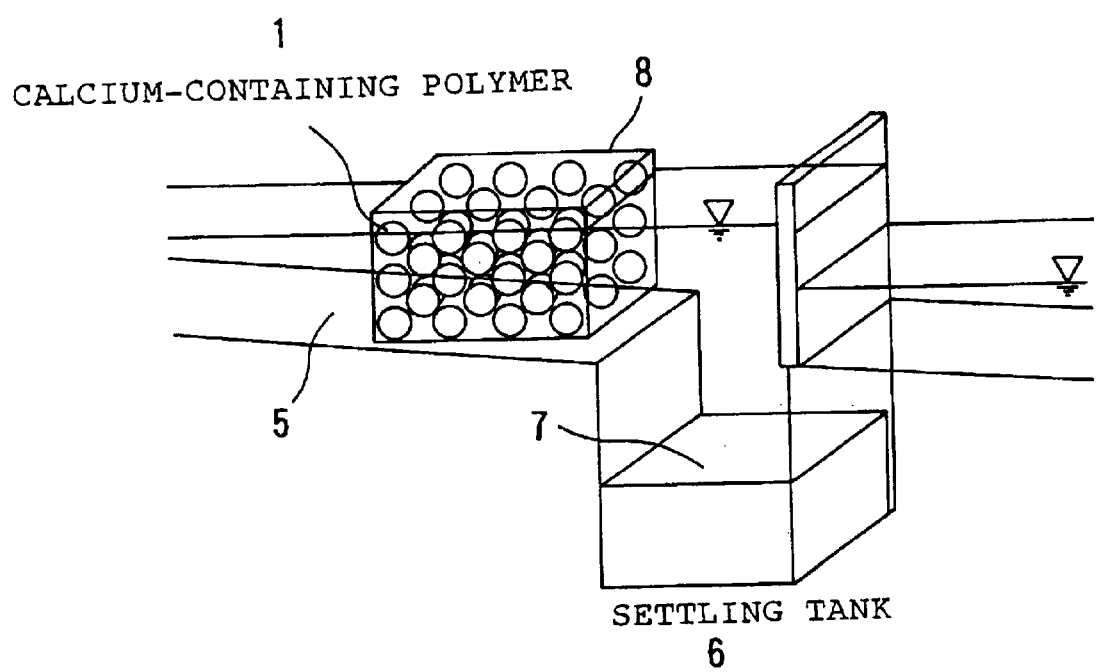
FIG. 3 shows an outlined constitutional view illustrating an example of a processing system in which a settling tank is disposed.

While obtained calcium apatite crystals can be re-used, for example, as fertilizers, it is desired that they are recovered by a more simple method so as not to be discharged from the draining channel. Various kinds of means may be considered for this purpose. For example, as shown in FIG. 3, calcium apatite crystals (7) can be separated and recovered easily from wastewater by disposing a setting tank (6) at the terminal end of the draining channel (5) and periodically recovering them. Releasing or diffusion of calcium from the immobilizing support can be controlled, for example, in accordance with concentration of PVA or the like as the polymer of the immobilizing support, calcium concentration, thickness of the immobilizing support and vibration speed. It is essential to prevent inhibition of calcium diffusion in a case where reaction is taken place on the surface of the support. Calcium phosphate can be re-used as a fertilizer by periodical recovering operation by diffusing calcium in the inside of the support by compulsory vibration, accumulating calcium apatite as reaction products to the settling tank and recovering them periodically. In this case, the calcium containing polymeric support is exchanged, for example, periodically.

In the embodiment shown in FIG. 3, the calcium containing polymeric support (1) is placed, for example, in an easily vibrated cage (8) and dipped in a place of a draining channel (5) where wastewater runs and the cage (8) or the like is disposed at the succeeding place so that the cage (8) can be vibrated mechanically or electrically, but it is not restricted only to such an example. The processing conditions are set appropriately and the immobilizing support may be of a fixed bed or a fluidized bed.

Then, examples are shown next and the invention is to be explained more in details.

EXAMPLE

Example 1

Method of Preparing Calcium-containing Immobilizing Support

<A>For the support of calcium, calcium hydroxide or quick lime is kneaded with acetylated starch at 1:1 (weight ratio) and prepared into a 5–10 mm spherical or pellet shape by an extrusion molding machine, which is dropped into an aqueous 10 to 15 wt % solution of PVA, on which a thin layer is formed.

It is preferred that the average molecular weight of PVA is about 2000 and the saponification degree thereof is about 95% or more. An aqueous solution of PVA at 10 to 15% by weight is prepared and used. Since water-containing PVA molecules have a nature of releasing water molecules from the solid structure of the polymer to be gelled and form a strong structure when repeating refrigeration and thawing, this property is utilized. Specifically, it was frozen at a low temperature of about −20° C. for 24 to 48 hours, which is repeated for 2–3 times to progress polymerization of PVA and enhance the physical strength. The substitution degree of acetylation for the acetylated starch and the size of the porous gel of the PVA polymer obtained by the operation control the releasing speed of the calcium ions.

<B>Further, since alginic acid ions have a property of chemically bonding with calcium ions to form a polymer and become insolubilized, this property can be utilized for the coating of the surface of the polymeric solid. Specifically, the polymeric solid is dropped in an aqueous solution of alginic acid at 0.5 to 5% by weight, or an aqueous solution of alginic acid at 0.5–5% by weight is sprayed on the surface of the polymeric solid, which is dropped in a saturated solution of calcium chloride. Then, the thus formed calcium alginate is rendered water insoluble and the coating layer is formed thereon with the aqueous solution of PVA at 10 to 15 wt % described above, and refrigeration is repeated for 2 to 3 times at a low temperature of about −20° C. to gel the same.

<C>When the magnetite is used, 1.5 to 3.0 g of magnetite is previously mixed preferably to 50–100 ml of an aqueous solution of PVA before polymerization by refrigeration or the like, which is then used.

Example 2

Figure 4:
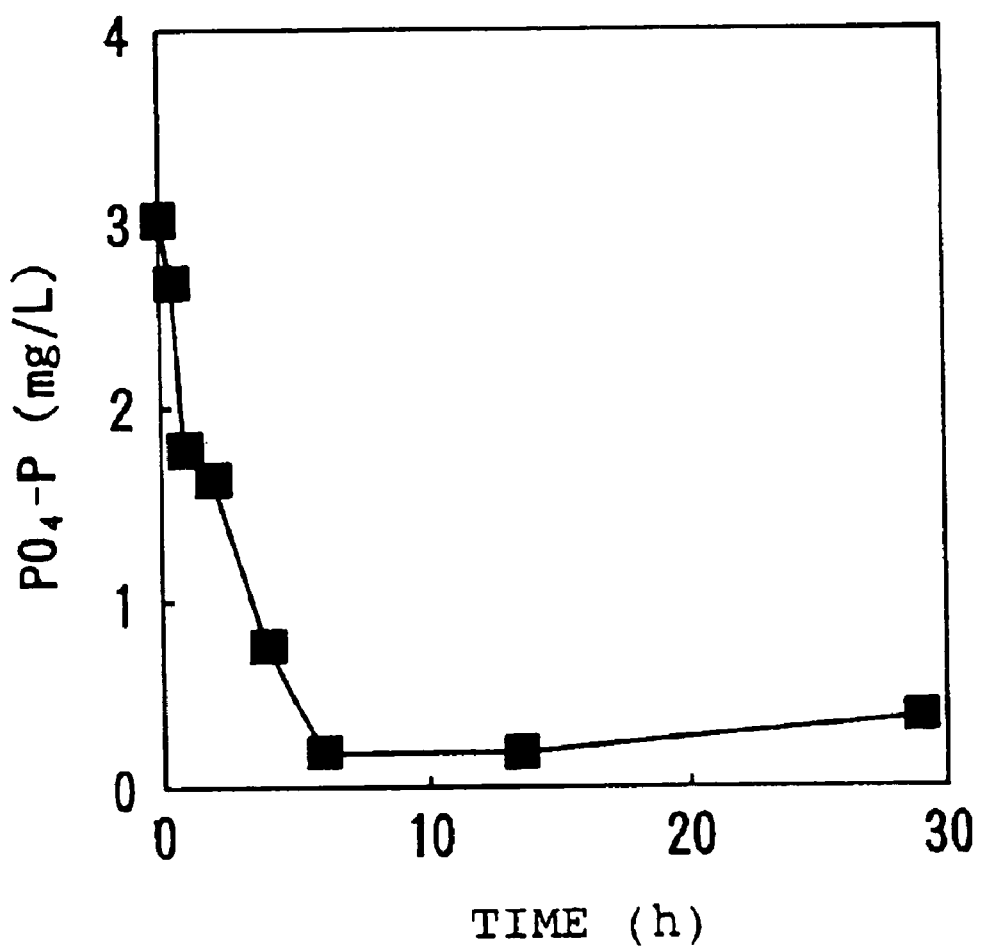
FIG. 4 shows a graph illustrating the result of processing in a case where seed crystals are not present.
Figure 5:
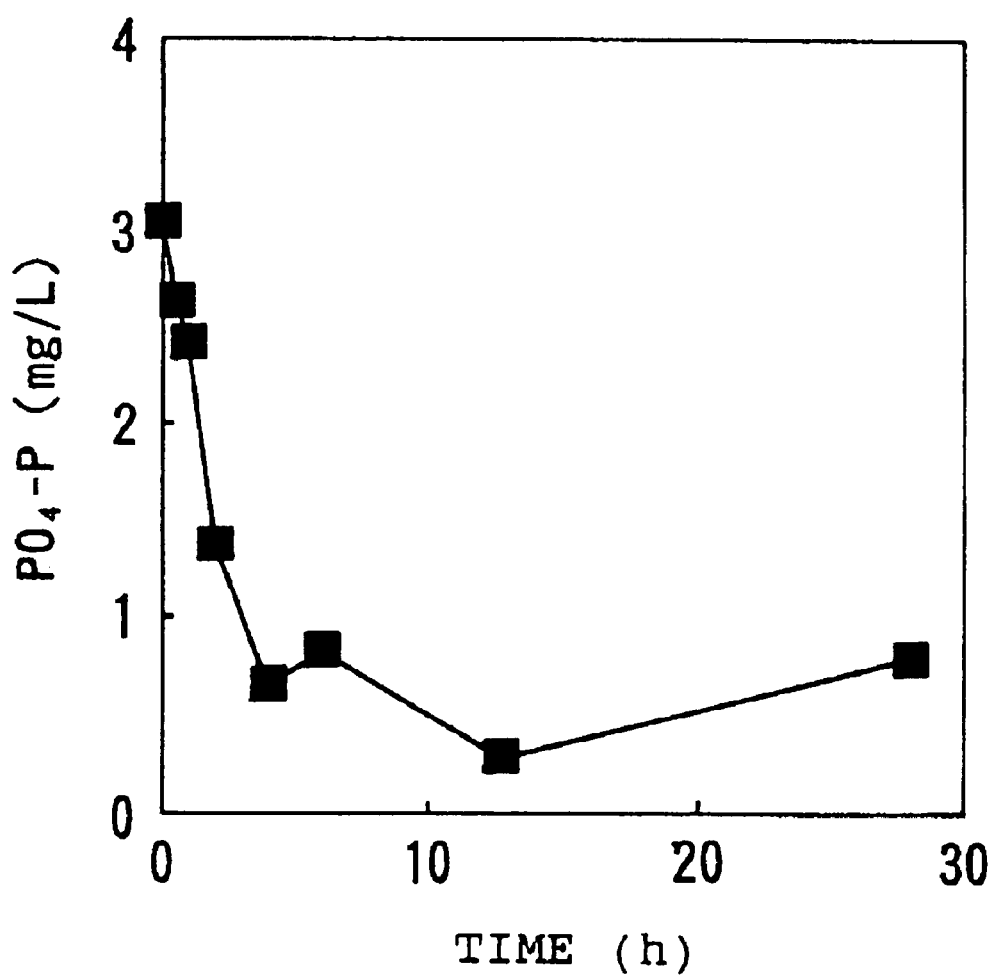
FIG. 5 shows a graph illustrating the result of processing in a case where seed crystals are present. References in the drawings, denote the followings.

Calcium is supported to form an inclusion immobilizing support as in Example 1<A>. A solution at an initial phosphoric acid concentration of 3 mg/L was processed by using the same. FIG. 4 shows a relation between the processing time and the change of the phosphoric acid solution in a case of not adding calcium chloride as seed crystals and FIG. 5 shows that in a case of adding the seed crystals.

As a result, it was confirmed that the concentration of phosphoric acid can be lowered to about 0.1 to 1 mg/L. Since the phosphoric acid concentration in domestic wastewater draining channel is usually about several mg/L, it can be expected for a removing ratio of about 80% to 90%. It is considered that the final concentration is about 0.5 mg/L also in a case where the concentration of phosphoric acid is higher than several mg/L.

According to the invention of the present application, excellent effects can be obtained in that (1) calcium can be added easily by including and immobilizing calcium in the polymer, (2) surface deposition and diffusion of calcium can be controlled by vibrating the magnetite-containing polymer electrically or mechanically and (3) calcium apatite crystals can be separated and recovered from wastewater by periodically recovering then in a settling tank disposed at the final end of the draining channel and calcium phosphate can be used again easily as the calcium phosphate in the crystallizing operation of selectively removing phosphoric acid in wastewater in the draining channels.

What is claimed is:

1. A method of removing phosphoric acid contained in wastewater, which comprises immobilizing calcium or a compound thereof in a polymeric solid, and contacting the resultant polymeric solid with the wastewater to form calcium apatite by reaction between phosphoric acid in the wastewater and calcium, wherein the polymeric solid is at least one member selected from the group consisting of polyvinyl alcohol, partially esterified polyvinyl alcohol, polyacrylic acid, partially esterified polyacrylic acid, starch, partially acetylated starch, polysaccharides and partially esterified polysaccharides.

2. A method of removing phosphoric acid contained in wastewater as defined in claim 1, wherein the calcium compound is at least one member from calcium hydroxide, inorganic acid salt of calcium and organic carboxylic acid salt of calcium.

3. A method of removing phosphoric acid contained in wastewater as defined in claim 1, wherein the polymeric solid is a gelled polyvinyl alcohol or a partial esterification product thereof.

4. A method of removing phosphoric acid contained in wastewater as defined in claim 1, wherein the polymeric solid has a multi-layered structure.

5. A method of removing phosphoric acid contained in wastewater as defined in claim 4, wherein the polymeric solid is formed with a coating layer of calcium alginate.

6. A method as defined in claim 1, wherein the polymeric solid containing calcium or the compound thereof is mechanically vibrated to control surface deposition of calcium phosphate and diffusion of calcium.

7. A method as defined in claim 1, wherein formed calcium apatite is recovered in running water.

8. A method of removing phosphoric acid contained in wastewater, which comprises immobilizing calcium or a compound thereof and magnetite in a polymeric solid, and contacting the resultant polymeric solid with the wastewater to form calcium apatite by reaction between phosphoric acid in the wastewater and calcium, wherein the polymeric solid is at least one member selected from the group consisting of polyvinyl alcohol, partially esterified polyvinyl alcohol, polyacrylic acid, partially esterified polyacrylic acid, starch, partially acetylated starch, polysaccharides and partially esterified polysaccharides.

9. A method as defined in claim 8, wherein the polymeric solid containing calcium or the compound thereof and magnetite is mechanically or electromagnetically vibrated to control surface deposition of calcium phosphate and diffusion of calcium.

10. A method of removing phosphoric acid contained in wastewater as defined in claim 8, wherein the calcium compound is at least one member from calcium hydroxide, inorganic acid salt of calcium and organic carboxylic acid salt of calcium.

11. A method of removing phosphoric acid contained in wastewater as defined in claim 8, wherein the polymeric solid is a gelled polyvinyl alcohol or a partial esterification product thereof.

12. A method of removing phosphoric acid contained in wastewater as defined in claim 8, wherein the polymeric solid has a multi-layered structure.

13. A method of removing phosphoric acid contained in wastewater as defined in claim 12, wherein the polymeric solid is formed with a coating layer of calcium alginate.

14. A method as defined in claim 8, wherein the polymeric solid containing calcium or the compound thereof is mechanically vibrated to control surface deposition of calcium phosphate and diffusion of calcium.

15. A method as defined in claim 8, wherein formed calcium apatite is recovered in running water.

* * * * *

UNITED STATES PATENT AND TRADEMARK OFFICE
CERTIFICATE OF CORRECTION

PATENT NO. : 6,716,357 B1
DATED : April 6, 2004
INVENTOR(S) : Takaaki Maekawa et al.

It is certified that error appears in the above-identified patent and that said Letters Patent is hereby corrected as shown below:

<u>Title page,</u>
Item [54], Title, change "CONTAINTING" to -- CONTAINING --.

Signed and Sealed this

Thirtieth Day of November, 2004

JON W. DUDAS
*Director of the United States Patent and Trademark Office*